May 23, 1933.  C. S. KNIGHT  1,910,771
FILTER MANUFACTURE
Filed Aug. 18, 1930   2 Sheets-Sheet 1

Inventor
Charlotte S. Knight
By Walter M. Fuller
Atty

May 23, 1933.  C. S. KNIGHT  1,910,771
FILTER MANUFACTURE
Filed Aug. 18, 1930   2 Sheets-Sheet 2
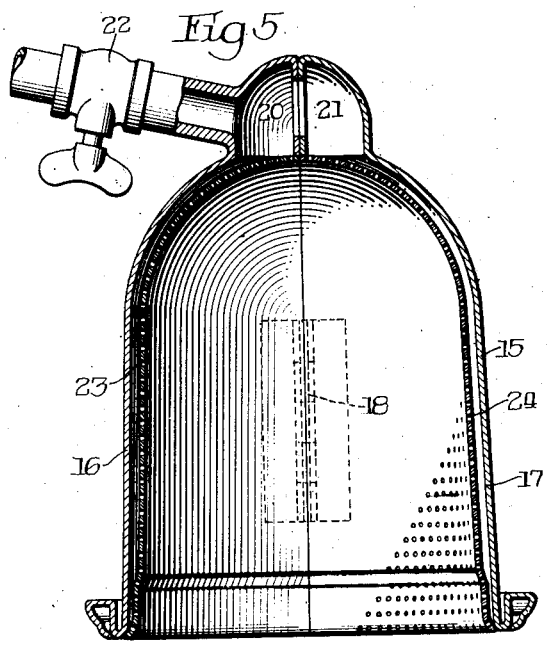
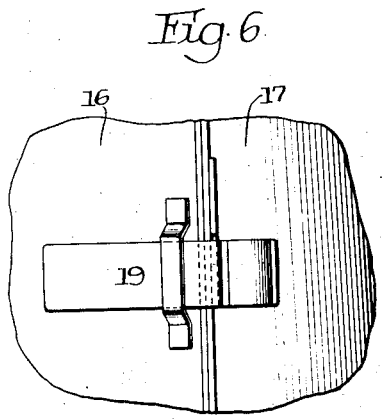
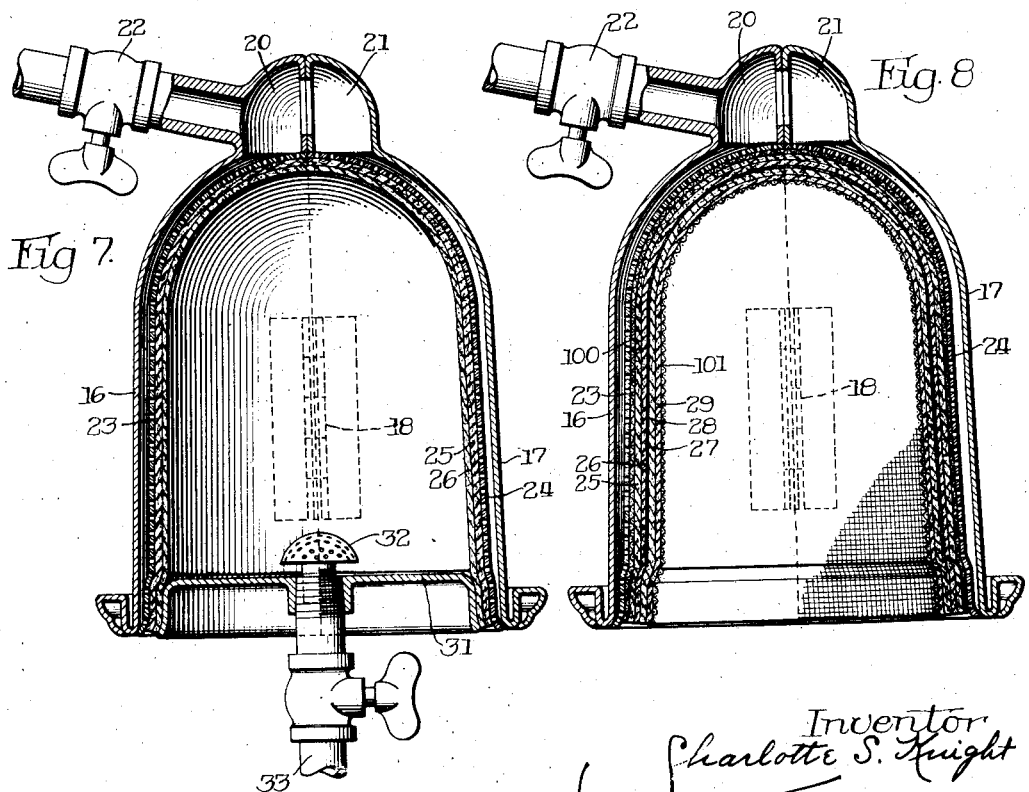

Patented May 23, 1933

1,910,771

UNITED STATES PATENT OFFICE

CHARLOTTE S. KNIGHT, OF FREEPORT, NEW YORK, ASSIGNOR OF THREE-FOURTHS TO IRA A. CAMPBELL, OF NEW YORK, N. Y.

FILTER MANUFACTURE

Application filed August 18, 1930. Serial No. 476,105.

My invention concerns the production or fabrication of filter media and relates more particularly to the manufacture of such elements from asbestos, which material I have found, from long experience, to be especially well adapted to perform the filtering function.

Such novel and improved filter element comprises a number of superposed layers of asbestos, the fibres of the several strata being desirably of different lengths, and the invention, in part, pertains to the successful and economic production of such layers and to the finished filter product.

In the present, preferred manner of practice, the method of making the filter bodies, desirably, but not necessarily, of general bell or cup shape, comprises several steps and these have been detailed below, but in considering the following description of the process and of the physical properties of the filter member itself, it should be borne in mind that many more or less radical modifications or changes may be resorted to without departure from the general principles of procedure on which the invention is based.

In the accompanying drawings, forming a part of this specification, and to which reference should be had in connection with the following detailed description, I have illustrated the manufacture of two different types of such filter elements, and, for simplicity, like parts have been designated by the same reference numerals throughout the several views.

In the drawings:—

Figure 5 is a longitudinal section through such outer mold on line 5—5 of Figure 4;

Figure 6 is a side view of a portion of the outer mold-member illustrating the spring catch for holding its hinged parts in closed relation;

Figure 7 is a view similar to Figure 5 showing the outer mold-member accommodating a partially constructed filter; and Figure 8 is a section through the outer mold showing the making of a reenforced filter-element.

Figure 1:
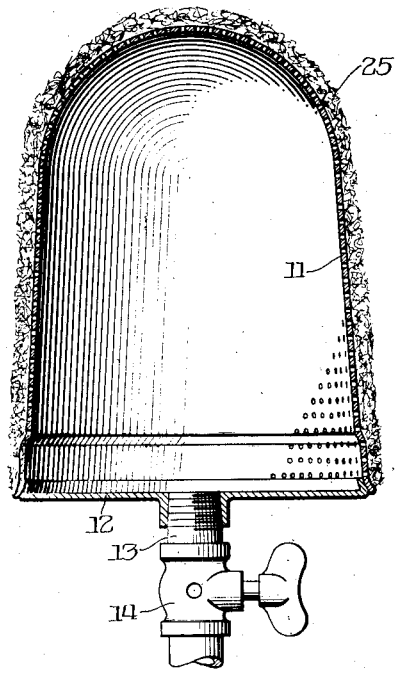
Figure 1 is a central section through one of the forms employed in the production of the filter member and illustrates it covered with a stratum of comparatively long-fibre asbestos held thereon by suction applied to the inside of the perforated form or maintained thereon in any other convenient and appropriate manner.
Figure 2:
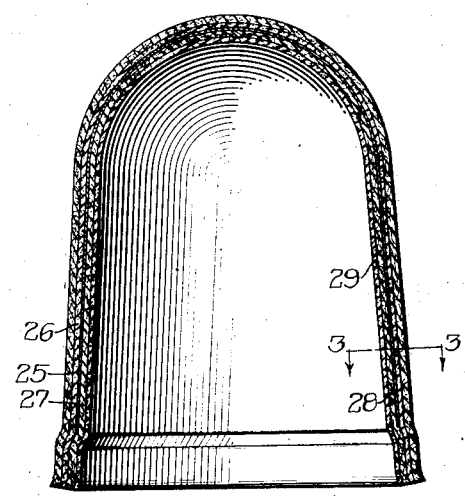
Figure 2 is a longitudinal, central section through the cup-shaped filter body.
Figure 3:
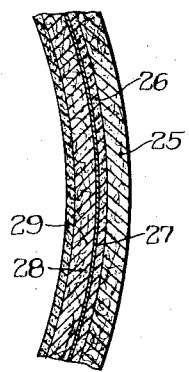
Figure 3 is an enlarged, fragmentary section on line 3—3 of Figure 2.

Referring first to Figures 1 to 7, inclusive, and more particularly preliminarily to Figure 1, it will be noted that this bell or cup shaped, apertured or perforated form or pattern 11 has its mouth closed by a wall 12, a central opening through which, by means of a pipe 13 and a two-way hand-operated valve 14, may be connected to any suitable source of suction or to the atmosphere.

Assuming that sub-atmospheric pressure has been applied to the interior of such form-member 11, it then has a coating of relatively-dry, comparatively-long-fibre asbestos 25 applied uniformly over its entire apertured or perforated surface, as depicted in Figure 1.

Such coating of the asbestos on the form may be brought about by introducing the latter into a body of loose, long-fibre, flocculent asbestos, which will substantially uniformly distribute itself over the surface of the pattern 11 by reason of the active suction therein, or, if preferred, a measured or predetermined quantity of such fluffy asbestos may be picked up by the form as the latter is brought in proximity thereto, or it may be placed on the form by hand, so that the asbestos is relatively evenly distributed over the entire bell-shaped surface.

In some cases it may be desirable merely to wet the form and cause the asbestos to adhere thereto by reason of such moisture rather than by the application of suction.

Figure 4:
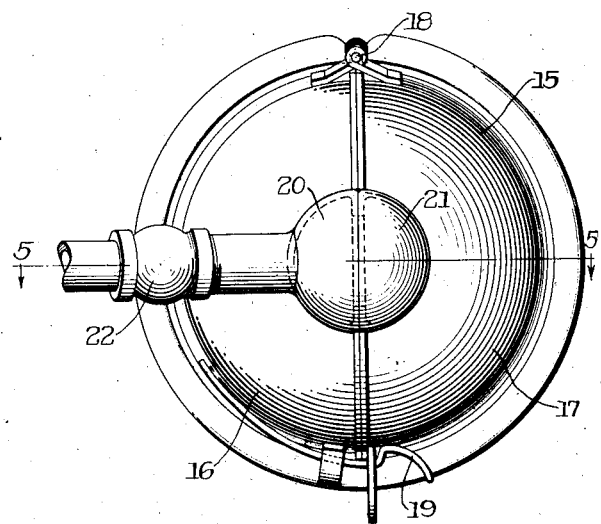
Figure 4 is a top plan view of the outer form or mold-member employed in the manufacture of the filter.

A complementary or companion, practically bell or cup shaped, separable or divided mold-member, designated as a whole 15, is composed of mating, semi-circular, hollow sections 16 and 17 hinged together longitudinally at 18 and equipped with a hand-releasable spring-catch 19 adapted to maintain the member in closed condition, as presented in Figures 4, 5 and 6, but permitting the opening of the mold-member in a manner easily understood.

Such parts 16 and 17 at their tops have registering, communicating, half-dome extensions 20 and 21, the former having a connection equipped with a valve 22 adapted for association with a source of suction or of compressed-air.

Internally the sections 16 and 17 have finely perforated, matching or mating screens 23 and 24 unitedly of substantially the same general shape as the main body of the divided casing in which they are mounted with a shallow space between them and their supporting or encasing members 16 and 17, whereby suction or air pressure imposed in the conduit fitted with the valve 22 will be present at all of the numerous apertures of the screen.

Such screen sections or parts, as is clearly depicted, are attached as by soldering or brazing to the margin at the mouth of the mold-member 15, so that the entire interior of the latter is covered by the thin, apertured screen.

Form 11 having been overspread with the adhering, long-fibre, asbestos stratum 25, it, with such coating is inserted inside of the screen 23, 24 of the outer mold 15, bringing its relatively loose asbestos covering into direct contact or engagement with such screen.

By turning valve 14 to terminate the suction inside of member 11, provided sub-atmospheric pressure has been used for the asbestos application, and admitting air thereinto, if necessary or desirable, and by working valve 22 to impose suction on the inside of the outer casing 15, the stratum 25 of asbestos is transferred from the outer surface of the inner form to the inner surface of the united screen members 23, 24 of the outer mold to which it remains adhered by reason of the continued suction.

Then the inner form is removed and the outer form with its stratum of asbestos and with the suction still active is inserted in water or other liquid to assist in compacting its asbestos fibres, such condensation being effected, at least in part, by reason of the suction action thereon.

Thereupon, the outer mold 15 with its contained lining of wet asbestos is inserted in a vessel containing water, or other appropriate liquid, in which a body or supply of short-fibre asbestos is stirred up or agitated to maintain its substantial uniformity of distribution.

The suction exerted through the valve 22 thus causes a second layer 26 of asbestos of the shorter fibre to adhere to the inside of the previously-described, first stratum of longer fibre, and this second layer is substantially evenly deposited because the suction is uniformly present throughout the interior of such mold element.

Then activated carbon, or other appropriate decolorizing, deodorizing and purifying material 27 is applied either in dry form or mixed with water or other liquid to the inner surface of such second layer, preferably by spraying it thereon, but not to its outer, marginal portion.

To accomplish this result, a slightly-tapered, sheet-metal closure 31 is temporarily inserted in the mouth of the partially-completed filter-element and contacts with and covers its inner surface around its lower edge or border, such member 31 being equipped on its top with a spraying-nozzle 32 connected to a feed pipe 33 through which the activated carbon, desirably mixed with water, is delivered to the nozzle from which it is played or spread evenly upon the exposed inner face of the second layer of asbestos; it being understood, that, because of the employment of the covering or protective shield 31 no carbon is deposited on or applied to the asbestos immediately adjacent to its edge or border. Member 31, 32 is then removed.

After that, another covering 28 of long-fibre, dry asbestos is applied to the form 11, as in the previous instance, and such coated form is introduced into the outer mold inside of the carbon layer 27, the suction application of form 11, if used, is then ended, while the suction in the outer casing or mold-member 15 is continued, with the result that, as in the previous case, this stratum 28 is transferred to the inside of the outer mold and on to the carbon and stratum of asbestos previously formed, after which the inner form is withdrawn, leaving this third stratum applied to the preceding ones.

Such mold or casing 15 and its several internal coatings may then, if necessary, be introduced into water or other liquid to wet and compact the stratum 28 in a manner hereinabove described.

Then the outer mold and its contents are again introduced into the liquid, such as water, containing the agitated short-fibre asbestos, and another coating or layer 29 thereof is deposited on the inside of the previously applied ones by suction.

At this time, the outer casing or mold accommodates within it a bell or cup shaped, wet, asbestos filter-element composed of five layers, two of long-fibre asbestos, two of short-fibre asbestos, which compacts more thoroughly than the other and tends to seal its pores, and an intermediate or middle layer of carbon.

To remove the multi-layer, wet filter-element from the outer mold, the suction application thereto is terminated and compressed-air may be, if necessary, introduced through the valve 22 to free the asbestos fibres from the holes or apertures of the screen, and then the form member may be unlatched and opened up for the removal of the filter-body.

In some cases, the action of the compressed-air results in the sufficient freeing of the filter-member from the screen, so that it may be readily taken out without expanding or opening the mold, and, in other instances, it is feasible to dispense with the compressed-air and merely open the mold to allow the filter-member to be extracted.

Thus it will be apparent that the divided-mold feature and the compressed-air method may be used either singly or conjointly to assist in the ready withdrawal of the filter-medium.

Inasmuch as there is no carbon present between the edge portions of the asbestos layers, the latter become more firmly united together around the mouth of the filter, so that, in the resulting product, the several layers are fully and adequately bound or sealed together around their margins, thus eliminating any danger of their unintentional separation and preserving the carbon stratum fully and properly sealed in the body of the filter.

The cup-shaped filter-member removed from the mold is heated or baked to dry, harden and stiffen it, so that it may be handled and transported without danger of breakage or injury, such elimination of moisture, due to the heating, also interlocking the asbestos fibres more effectively and probably also reducing the sizes of the interstices in the structure.

In some cases, it is desirable to strengthen the filter-member by incorporating in it one or more foraminous or reticulated supporting elements which may be conveniently made of woven wire or its equivalent, and such consolidated filter and reinforcing members may be of any approved or suitable size and shape.

To make such types of filter-media, the same style of inner form and outer mold-members 11 and 15 may be satisfactorily employed or others of different mode or pattern may be used, if preferred.

The process is practiced in practically the manner hereinbefore presented, except that before the inner form with its first layer of long-fibre asbestos is introduced into the outer mold-member, a woven-wire or other apertured or skeleton strengthening body 100 of practically the same shape and slightly smaller than the united-screen sections 23, 24 is inserted in the latter and then the multi-layer filter-medium is made progressively in the part 100, as previously set forth, and, after the last asbestos layer has been deposited, another woven wire or equivalent member 101 of proper form and dimensions is snugly fitted inside of the then wet filter body.

Upon removal of the filter-medium and its incorporated external and internal reinforcements from the outer mold, it is heated or baked as already described to dry and harden it, the inner and outer woven wire bodies forming permanent strengthening elements of the completed filter.

While I have indicated the use of two such openwork metal members for the filter-element, either one alone may be availed of, if preferred, and they are desirably made of copper, since such metal, in some instances, seems to exert a beneficial influence when the filter is employed for the treatment of water.

In both instances, the shorter fibre asbestos, which is not as expensive as the longer fibre, is conveniently and economically employed for that reason, and it tends to lock the longer fibres together and to form a closer, more compact and less porous filter-medium.

Those having knowledge of this art will understand that this invention is not limited to all of the details set forth and that many changes may be resorted to without departure from the heart and essence of the invention, as defined by the appended claims, and without the loss or sacrifice of any of its material benefits.

For example, one or more of the strata of asbestos may be omitted, and, if preferred, the activated carbon layer may be eliminated.

I claim:

1. The method of making a filter-medium including forming a stratum of the desired shape of dry asbestos fibres, wetting such stratum to compact it, then forming thereon a layer of asbestos, the fibres of which are of a substantially shorter length than those of said stratum, and drying the filter-element thus produced.

2. The method of making a filter-medium including forming a stratum of the desired shape of dry asbestos fibres, wetting and applying suction to said stratum to compact it, and drying the filter-element thus produced.

3. The method of making a filter-medium including forming a stratum of the desired shape of dry asbestos fibres, wetting and applying suction to said stratum to compact it, forming thereon a layer of asbestos, the fibres of which are of a substantially shorter length than those of said stratum, and drying the filter-element thus produced.

4. The method of making a filter-medium including forming a stratum of the desired shape of dry asbestos fibres, wetting such stratum to compact it, applying a layer of asbestos on said stratum by sucking thereonto asbestos fibres of shorter length suspended in a body of liquid, and drying the filter-element thus produced.

5. The method of making a filter-medium including forming a stratum of the desired shape of dry asbestos fibres, wetting and applying suction to said stratum to compact it, applying a layer of asbestos on said stratum by sucking thereonto asbestos fibres of shorter length suspended in a body of liquid, and drying the filter-element thus produced.

6. The method of making a filter-medium including forming a stratum of the desired shape of dry asbestos fibres, wetting such stratum to compact it, forming a layer of wet asbestos on said stratum, the fibres of said layer being of substantially different length from those of said stratum, and drying the filter-element thus produced.

7. The method of making a filter-medium including forming a stratum of the desired shape of dry asbestos fibres, wetting such stratum to compact it, forming a layer of wet asbestos on said stratum, the fibres of said layer being substantially shorter than those of said stratum, coating said filter-element with a layer of activated carbon, and drying the filter-element thus produced.

8. The method of making a filter-medium including forming a stratum of dry asbestos fibres, wetting such stratum to compact it, forming a layer of wet asbestos on said stratum, the fibres of said layer being of a substantially different length from those of said stratum, coating said layer with activated carbon, forming a second stratum of dry asbestos fibres on said carbon coating, wetting said second stratum to condense it, and drying the filter-medium thus produced.

9. The method of making a filter-medium including forming a stratum of dry asbestos fibres, wetting such stratum to compact it, forming a layer of wet asbestos on said stratum, the fibres of said layer being substantially shorter than those of said stratum, coating said layer with activated carbon, forming a second stratum of dry asbestos fibres on said carbon coating, wetting said second stratum to condense it, forming a second layer of wet asbestos on said second stratum, the fibres of said second layer being substantially shorter than those of said second stratum, and drying the filter-medium thus produced.

10. The method of making a filter-medium including providing a substantially bell-shaped or cup-shaped asbestos stratum of fibres of one length on a form, inserting said form and asbestos coating into a complementary substantially bell-shaped or cup-shaped apertured mold, transferring said asbestos stratum from said mold to said form by the application of suction to said mold, depositing a second stratum of asbestos fibres of a different length on the inside of said first stratum, and removing the filter-medium thus produced from the mold.

11. The method of making a filter-medium including providing a substantially bell-shaped or cup-shaped dry asbestos stratum of substantially long fibres on a form, inserting said form and asbestos coating into a complementary substantially bell-shaped or cup-shaped apertured mold, transferring said asbestos stratum from said form to said mold by the application of suction to the latter, wetting said stratum to compact it, depositing a wet asbestos stratum of shorter fibres on the inside of said first stratum, removing the wet filter-medium thus produced from said mold, and drying said filter-medium.

12. The method of making a filter-medium consisting in providing a substantially bell-shaped or cup-shaped dry asbestos stratum of substantially long fibres on a form, inserting said form and asbestos coating into a complementary substantially bell-shaped or cup-shaped apertured mold, transferring said stratum from said form to said mold by the application of suction to the latter, wetting said stratum to compact it, immersing said mold with said stratum therein and with the suction applied in a liquid bath containing suspended asbestos fibres of substantially shorter length than those of said stratum to provide a layer of such short asbestos fibres inside of said stratum, coating said layer, except in its border portion, with activated carbon, applying a second stratum of dry long-fibre asbestos to said form, inserting such form and said second stratum inside of, and transferring said second stratum to, said partially-completed filter-medium in said mold by suction applied to said mold, removing said form from said mold, wetting said second transferred stratum, immersing said mold and its several asbestos thicknesses in water during the application of suction, applying a short-fibre layer of asbestos inside of said second stratum in substantially the same way that said first short-fibre asbestos was deposited, removing such wet filter-medium from said mold, and drying said filter-medium.

13. The method of making a filter-medium including forming an asbestos stratum on the outside of a substantially bell-shaped or cup-shaped externally-apertured form by suction applied to the interior of such form, inserting said form and its asbestos coating into a complementary substantially bell-shaped or cup-shaped internally-apertured mold, transferring said asbestos stratum from said form to the interior surface of said mold by the application of suction inside of said mold after termination of the suction in said form, and removing the filter-medium thus produced from said mold after the suction in the latter has ended.

In testimony whereof I have hereunto set my hand.

CHARLOTTE S. KNIGHT.